(12) United States Patent
Pastore et al.

(10) Patent No.: US 11,200,349 B2
(45) Date of Patent: Dec. 14, 2021

(54) METHOD FOR MANAGING AN ACCESS AND DISPLAY SERVICE OF CONFIDENTIAL INFORMATION AND DATA BY MEANS OF A VIRTUAL DESKTOP

(71) Applicant: BOOLE SERVER S.r.l., Milan (IT)

(72) Inventors: Valerio Pastore, Milan (IT); Daniele Leone, Milan (IT)

(73) Assignee: BOOLE SERVER S.r.l., Milan (IT)

(*) Notice: Subject to any disclaimer, the term of this patent is extended or adjusted under 35 U.S.C. 154(b) by 59 days.

(21) Appl. No.: 16/758,985

(22) PCT Filed: Oct. 25, 2017

(86) PCT No.: PCT/IT2017/000235
§ 371 (c)(1),
(2) Date: Apr. 24, 2020

(87) PCT Pub. No.: WO2019/082214
PCT Pub. Date: May 2, 2019

(65) Prior Publication Data
US 2020/0342145 A1 Oct. 29, 2020

(51) Int. Cl.
*G06F 21/84* (2013.01)
*G06F 9/451* (2018.01)
(Continued)

(52) U.S. Cl.
CPC ............ *G06F 21/84* (2013.01); *G06F 9/452* (2018.02); *G06F 21/53* (2013.01); *G06F 21/6254* (2013.01); *G06F 2221/032* (2013.01)

(58) Field of Classification Search
CPC .......... G06F 21/84; G06F 9/452; G06F 21/53; G06F 21/6254; G06F 2221/032; G06F 9/451; G06F 9/455
See application file for complete search history.

(56) References Cited

U.S. PATENT DOCUMENTS 8,205,072 B1   6/2012  Gentil et al.
10,579,795 B1 * 3/2020  Wueest ................ G06F 21/554
(Continued)

OTHER PUBLICATIONS

International Search Report and Written Opinion of the International Searching Authority for International Patent Application No. PCT/IT2017/000235 dated Apr. 13, 2018, 9 pages.

*Primary Examiner* — Darren B Schwartz
(74) *Attorney, Agent, or Firm* — Merchant & Gould P.C.

(57) ABSTRACT

A method manages an access and display service of confidential information and data (DAT) by a computer system including at least one user electronic device. The method includes selecting, by a processing unit of the computer system, the DAT to be displayed based on a unique identifier associated with the DAT. The DAT is acquired in encrypted form from a memory unit of the computer system. The method decrypts the DAT in encrypted form to generate a plaintext information or data. A virtual desktop associated with the electronic device is generated and includes generating the virtual desktop on the display of the electronic device and providing the generated virtual desktop only with the process associated with an executable file representative of the unique identifier of the DAT to be displayed. A message is provided containing the plaintext information or data to be sent to the virtual desktop for display.

9 Claims, 3 Drawing Sheets

(51) Int. Cl.
    *G06F 21/53*     (2013.01)
    *G06F 21/62*     (2013.01)
    *G06F 9/455*     (2018.01)

(56) References Cited

U.S. PATENT DOCUMENTS

| | | | |
|---|---|---|---|
| 2005/0120237 A1* | 6/2005 | Roux | G06F 9/4843 |
| | | | 726/26 |
| 2006/0146057 A1 | 7/2006 | Blythe | |
| 2007/0018992 A1 | 1/2007 | Wong | |
| 2008/0301754 A1* | 12/2008 | Furuichi | G06F 21/62 |
| | | | 726/1 |
| 2009/0013409 A1* | 1/2009 | Wenzinger | G06F 8/60 |
| | | | 726/24 |
| 2010/0024036 A1 | 1/2010 | Morozov et al. | |
| 2010/0132013 A1* | 5/2010 | van Riel | G06F 21/53 |
| | | | 726/1 |
| 2013/0212709 A1* | 8/2013 | Tucker | G06F 21/55 |
| | | | 726/29 |
| 2014/0150106 A1* | 5/2014 | Butler | H04L 63/145 |
| | | | 726/24 |
| 2017/0286684 A1* | 10/2017 | Lovelace | G06F 21/6263 |

\* cited by examiner

METHOD FOR MANAGING AN ACCESS AND DISPLAY SERVICE OF CONFIDENTIAL INFORMATION AND DATA BY MEANS OF A VIRTUAL DESKTOP

This application is a National Stage Application of PCT/IT2017/000235, filed 25 Oct. 2017 and which application is incorporated herein by reference. To the extent appropriate, a claim of priority is made to of the above-disclosed application.

FIELD OF APPLICATION

The present invention relates to the field of Information Communication Technology (ICT). In particular, the invention relates to a method for managing an access and display service of confidential information and data by a user, by means of a virtual desktop.

BACKGROUND ART

As it is well known, a desktop is the layout of windows, icons and menus in the graphical user interface (GUI) or display of a computer (PC) configured to represent the state of use of the computer by a user and to allow the user to control the computer. In general, the desktop is a graphical representation of the operating system (OS) of the computer.

The most advanced operating systems, for example, Windows 10 or even OSX 10.11, MacOS Sierra, allow to create one or more virtual desktops on a single computer.

A virtual desktop is an additional desktop with respect to the current graphical representation of a computer. For example, a virtual desktop may expand the edges of a standard desktop to extend beyond the visible display.

A user may create a plurality of virtual desktops and then decide which one of these to display, depending on the circumstances, by switching from one virtual desktop to another. In particular, each virtual desktop is associated with a respective unique identifier, which allows to recognize and select it.

Each virtual desktop is configured to provide the actions undertaken on that desktop by the user: the applications launched, the windows open, the results of the actions, the icons organized, and so on.

Furthermore, it should be noted that each virtual desktop is characterized by a status of interaction with the user which is separate and independent of the status of interaction of the user with the current desktop and with the other virtual desktops generated.

Therefore, virtual desktops are computer tools useful to create work environments, separate from one another, for one user. Each virtual desktop may be configured with running applications, window placement, desktop tools, and other user interface elements for supporting a specific set of actions.

For example, a user may choose to generate a first virtual desktop for checking personal e-mails and for browsing the web, a second virtual desktop for editing videos or other multimedia files, and reserve the current computer desktop for managing network administration activities.

In the field of ICT, the need for being able to provide a user with data and information (files, documents, etc.) classified as confidential, for example, for being displayed on a desktop of a computer of the user for a predetermined period of time, has always been felt.

Currently, however, there are no known methodologies allowing to provide such confidential information and data on a computer of the user in protected mode, i.e., so as to prevent the copy or, more generally, the capture of such information once this is displayed on the computer of the user.

It is, in general, the object of the present description to provide a method for managing the access and display service of confidential information and data by a user in protected mode, employing a virtual desktop enabled by a software application. In particular, it is the object of the invention to provide a method for managing the access and display service of confidential information and data by means of a virtual desktop of an electronic device of the user, which allows to prevent the copy, the capture or analogous forms of export of such confidential information and data once this has been displayed on the virtual desktop itself.

It is a further object of the invention to provide a method for managing the access and display service of confidential information and data by means of a virtual desktop which, when running, is substantially free from any intrusion and/or alteration run by other software applications which may be enabled on the operating system of the electronic device of the user.

BRIEF DESCRIPTION OF THE DRAWINGS

Further features and advantages of the method for managing the access and display service of confidential information and data disclosed hereby, will become apparent from the following description of preferred embodiments, given by way of indicative and non-limiting example, with reference to the accompanying Figures, in which.

In the aforesaid Figures, equal or analogous elements are indicated by means of the same reference numerals.

DETAILED DESCRIPTION

Figure 1:
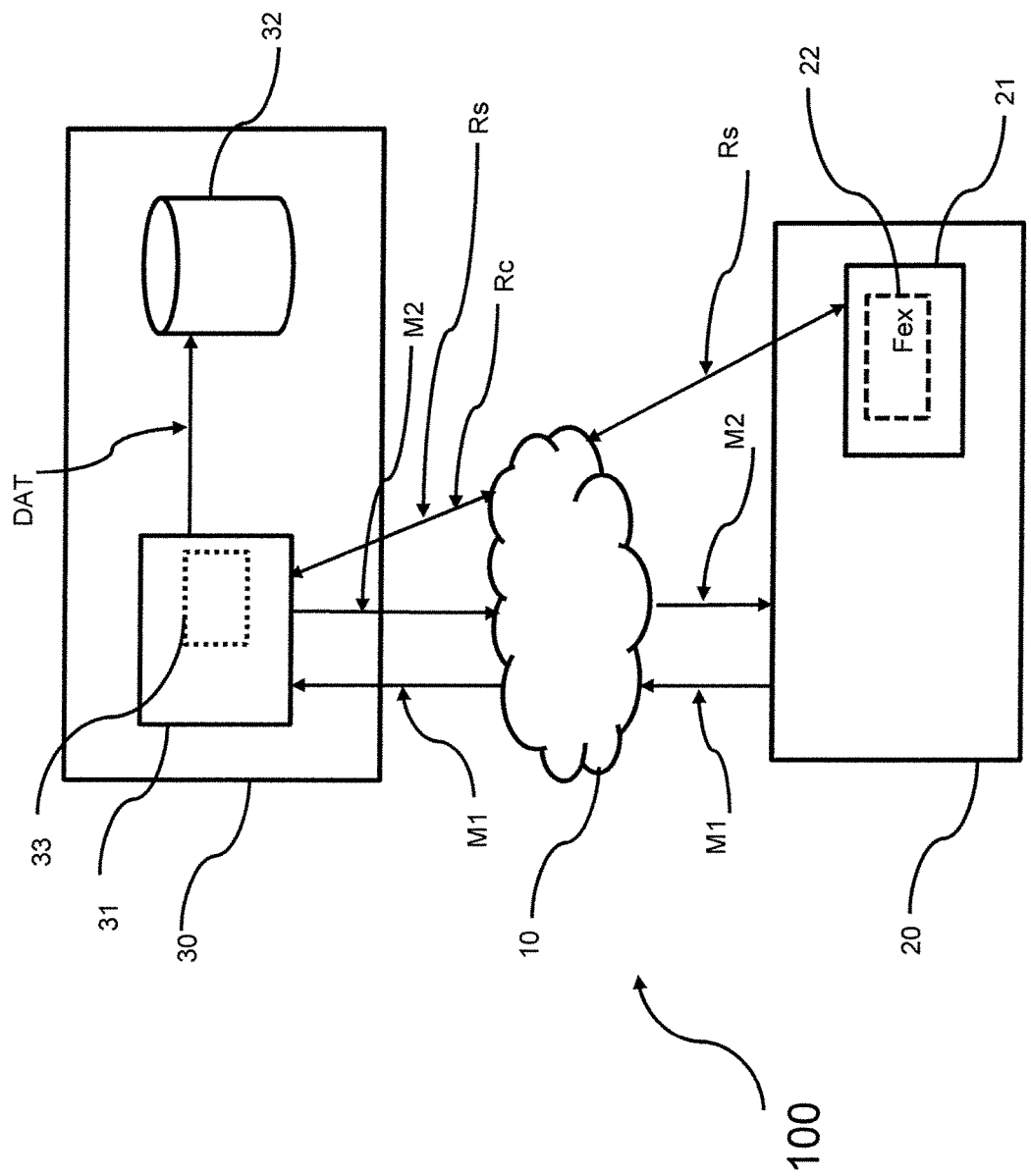
FIG. 1 schematically shows a block diagram of a first embodiment of a computer system adapted to implement the method for displaying confidential information and data employing a virtual desktop of the present description.

With reference to FIG. 1, a block diagram of a first embodiment of a computer system, adapted to implement the method of the present description, is overall indicated with reference numeral 100.

In the embodiment of FIG. 1, the method is preferably implemented by means of a telecommunications network 10, for example, the Internet 10. However, the method of the invention is not limited to such embodiment, as it will be clarified below.

In the following of the description, reference will be made to "confidential information and data" DAT to indicate, generally, information and data which are sensitive and/or difficult to access by users and stored in appropriate memory units, for example, in encrypted form.

In particular, the computer system 100 or simply the system 100 comprises at least one electronic device 20 associated with a respective user. Such electronic device may be of a portable type or of a non-portable type. In the following of the description, for simplicity, reference will be made explicitly to a portable electronic device 20, although the methodology of the present invention is also applicable to devices of the non-portable type, such as, for example a desktop PC.

Such portable electronic device 20 is configured to connect to the Internet 10.

For such object, for example, the portable electronic device 20 is equipped with a module for transferring data to the Internet in wireless mode by means of dedicated access points (in accordance with the Wi-Fi communication standard) and/or a respective module allowing for the transfer of data by means of the radio networks (for example, in accordance with the fourth/fifth generation communication standard-4G/5G).

Such portable electronic device 20 is embodied, by way of example, by a laptop, a smartphone, a tablet, a smartwatch, or by another portable electronic device equipped with analogous functionalities.

Furthermore, the portable device 20 comprises a respective graphical user interface (GUI) or display 21 for displaying a standard or traditional desktop of the device and one or more virtual desktops 22.

The computer system 100 further comprises a processing apparatus 30, in particular a server, for managing the access and display service of confidential information and data by a user. Such processing apparatus 30 is distinct from the portable device of the user 20.

In particular, such processing apparatus 30 comprises a processing unit or microprocessor 31 operating on the basis of an operating system, for example Windows O.S., and a memory unit 32 controlled by the aforesaid microprocessor 31 adapted to store such confidential information and data DAT in encrypted form.

It should be noted that the microprocessor 31 of the server 30 is configured to run an application program 33 comprising functional blocks configured to implement the method for managing the access and display service of confidential information and data DAT of the invention.

In general, such application program 33 is a safe data sharing and synchronization software solution, designed for individuals and companies which need to protect sensitive content and information.

Furthermore, the processing apparatus 30 is connectible to the Internet 10 by means of a routing electronic device (router) of the type known to the skilled in the art (not shown in detail in FIG. 1).

Starting from the above mentioned structural features of the system 100, a first embodiment is described below of the method for managing the access and display service of confidential information and data by a user, which is associated with a respective portable electronic device 20.

The method comprises a step of accessing, by means of the portable electronic device 20, to the processing apparatus 30 by means of a browser of the Internet 10 (for example, Google Chrome, Internet Explorer, Mozilla Firefox, Microsoft Edge, Safari, Opera, etc.).

In particular, such step of accessing comprises a step of sending, by means of the portable device 20, a first message M1 indicative of the confidential information or data DAT which the user desires to display.

In greater detail, such first message M1 contains a request for the protected display of the confidential information or data DAT to be displayed, which is associated with a specific and unique identifier ID.

Furthermore, the method comprises a step of sending to the portable device 20, by means of the microprocessor 31 of the server 30, a second message M2 generated on the basis of the aforesaid application program 33.

In particular, such second message M2 comprises an executable file $F_{ex}$ representative of the unique identifier ID of the confidential information or data DAT which is desired to be displayed.

In other words, the executable file $F_{ex}$ is generated by the application program 33.

As known to the skilled in the art, such executable file $F_{ex}$ is embodied by an executable program for a computer, i.e., a program written in machine language in a format adapted:
a) to be loaded by the operating system, therefore, ready for being executed;
b) for the hardware architecture of the processor executing it.

Subsequently, the method provides for a step of enabling or launching on the portable device 20 such executable file $F_{ex}$ to launch the display or generate a virtual desktop 22 on the display 21 of the portable device 20 itself.

In particular, such virtual desktop 22 consists of a single window generated by the executable file $F_{ex}$ and is independent of the standard processes of the operating system OS associated with the portable device 20.

In greater detail, the aforesaid step of generating the virtual desktop 22 comprises the steps of:
generating the virtual desktop 22 on the display 21 of the portable electronic device 20;
providing the generated virtual desktop 22 only with the process associated with the executable file $F_{ex}$.

By means of such steps, the method of the invention allows to generate a virtual desktop 22 in which the single process corresponding to the executable file $F_{ex}$ is active.

Thereby, advantageously, the method allows to generate a virtual desktop 22 in which no other processes are active and, consequently, the virtual desktop has no toolbars usable by the user to copy or capture the information displayed or viewable on the desktop itself.

In fact, being the executable file $F_{ex}$ the only process active on the generated virtual desktop 22, the user displays on such virtual desktop 22 only the document selected. In consideration of the latter, the virtual desktop 22 represents an environment protected from the export and/or capture of the data for displaying the confidential information or data DAT on the portable device 20 of the user.

Furthermore, advantageously, by means of the executable file $F_{ex}$, the method of the invention is configured to periodically monitor the processes running on the generated virtual desktop 22.

In greater detail, at the time of generating the virtual desktop 22, coinciding with an initial time instant T0, a record is provided for, comprising a list of processes active on the portable device 20 including exclusively the process associated with the aforesaid executable file $F_{ex}$.

The method of the invention comprises the further step of accessing, on the basis of the instructions contained in the executable file $F_{ex}$, such process list to check for the presence of any new active processes.

Starting from the initial instant T0, such access is performed periodically at the time instants T1, T2, T3, ..., Tn following the aforesaid initial instant T0. Each of the time instants T1, T2, T3, ..., Tn is separated from the following access instant by a predetermined duration D time interval.

The method also comprises a step of comparing the content of the process list associated with a general first access instant Ti (i=1, 2, 3, ..., n) with the content of the process list associated with the initial instant T0.

Following such comparison, the method comprises a step of deleting from the process list, on the basis of the instructions of the executable file $F_{ex}$, all of the active processes which differ from the process associated with the executable file $F_{ex}$ to disable them.

In particular, each process enabled or launched on the virtual desktop 22 during the execution of the executable file $F_{ex}$ is identified and subsequently closed, preventing the use thereof by the user.

Thereby, advantageously, the generated virtual desktop 22 is protected by any intrusion of other software applications. In other words, on the protected virtual desktop 22 generated in the portable device 20 only the process corresponding to the executable file $F_{ex}$ is active.

The Applicant has verified that setting the duration D of each of the time intervals, which separate each of the time instants T0, T1, T2, T3, . . . , Tn from the following one, equal to 250 msec, represents a fair compromise between the need to increase the effectiveness of the control and monitoring of the processes running on the virtual desktop 22 and the need to reduce the complexity of the method proposed.

Once the virtual desktop 22 environment is launched, the method comprises a step of sending, by means of the portable device 20, by means of the executable file $F_{ex}$ itself, a request message Rc to the server 30. Such request message Rc includes the aforesaid unique identifier ID of the information or data DAT to be displayed.

The method further comprises a step of acquiring, by means of the microprocessor 31 of the server 30, the information or data DAT stored in the memory unit 32 in encrypted form.

Furthermore, the method comprises a step of decrypting, by means of the microprocessor 31, such information or data DAT in encrypted form to generate a respective plaintext information or data DAT1.

Furthermore, the method comprises a step of providing the portable electronic device 20, by means of the processing apparatus 31 of the computer system 100, with a message Rs containing the plaintext information or data DAT1 to be sent to the generated virtual desktop 22 for displaying.

In particular, the method comprises a step of sending, by means of the microprocessor 31 of the server 30, a response message Rs to the portable electronic device 20 containing the plaintext information or data DAT1 to be displayed in the protected environment represented by the virtual desktop 22 of the portable device 20 itself.

Figure 2:
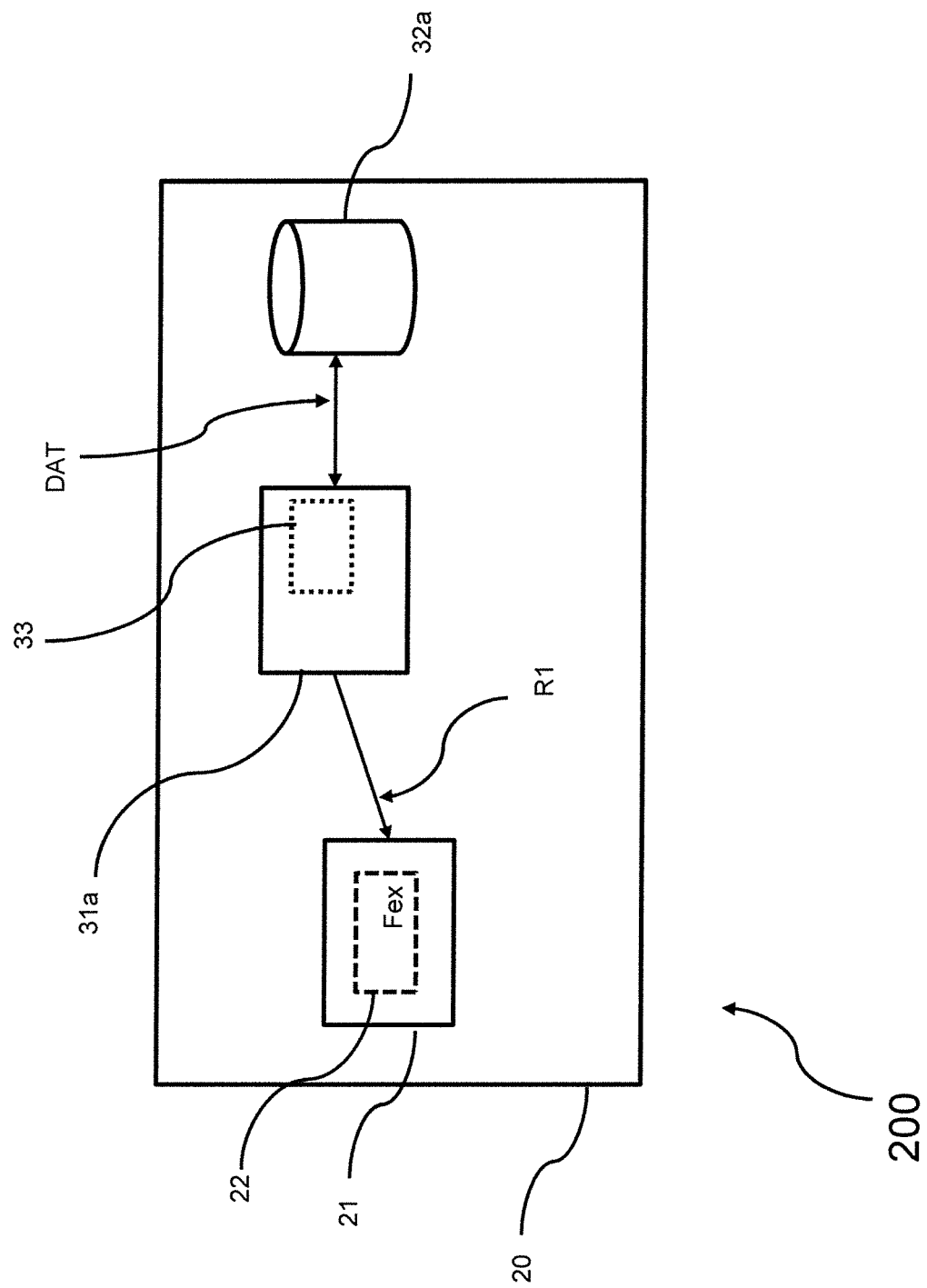
FIG. 2 schematically shows a block diagram of a second embodiment of a computer system adapted to implement the method for displaying confidential information and data employing a virtual desktop of the present description.

With reference to FIG. 2, a block diagram of a second embodiment of a computer system, adapted to implement the method of the present description, is overall indicated with reference numeral 200.

In the embodiment of FIG. 2, the computer system 200 implementing the method of the invention consists of an electronic device 20, in particular of the portable type, associated with a user, i.e., neither the telecommunications network nor other external processing apparatuses are provided for.

Such portable electronic device 20 is structurally analogous to that described with reference to FIG. 1. In particular, such portable device 20 comprises a respective graphical user interface or display 21 for displaying a standard desktop of the device and one or more virtual desktops 22.

Such portable electronic device 20 further comprises a respective processing unit 31a, for managing the access and display service of confidential information and data.

In particular, such processing unit 31a is embodied by a microprocessor 31a operating on the basis of an operating system, for example Windows O.S., and a memory unit 32 controlled by the aforesaid microprocessor 31a adapted to store such confidential information and data DAT in encrypted mode.

The processing unit 31a of the portable device 20 is configured to run the above mentioned application program 33, which includes functional blocks configured to implement the method for managing the access and display service of confidential information and data of the invention.

Starting from the aforesaid structural features of the computer system 200, a second embodiment is described below of the method for managing the access and display service of confidential information and data by a user, which is associated with the portable electronic device 20.

In particular, the method comprises a step of selecting, by means of the processing unit 31a of the portable device 20, the confidential information or data DAT which is desired to be displayed on the basis of a unique identifier ID associated thereto.

The method further comprises a step of acquiring the aforesaid confidential information or data DAT in encrypted form from the memory unit 32a of the portable device 20.

Thereafter, the method comprises a step of decrypting, by means of the processing unit 31a, such information or data DAT to generate a respective plaintext information or data DAT1.

Subsequently, the method provides for a step of launching the display of a virtual desktop 22 on the display 21 of the portable device 20 itself.

Such virtual desktop 22 associated with a unique identifier ID is generated on the basis of a respective executable file $F_{ex}$ in a manner analogous to what has been described above with reference to the computer system 100. It should be noted that such executable file has the same properties and ensures the same advantages as the executable file described with reference to the first embodiment of the method of the invention.

Furthermore, the method comprises a step of providing, by means of the processing apparatus 31a, a respective message R1 containing the plaintext information or data DAT1 to be sent to the generated virtual desktop 22, starting from the executable file $F_{ex}$, for displaying such data in the protected environment of the virtual desktop 22.

Figure 3:
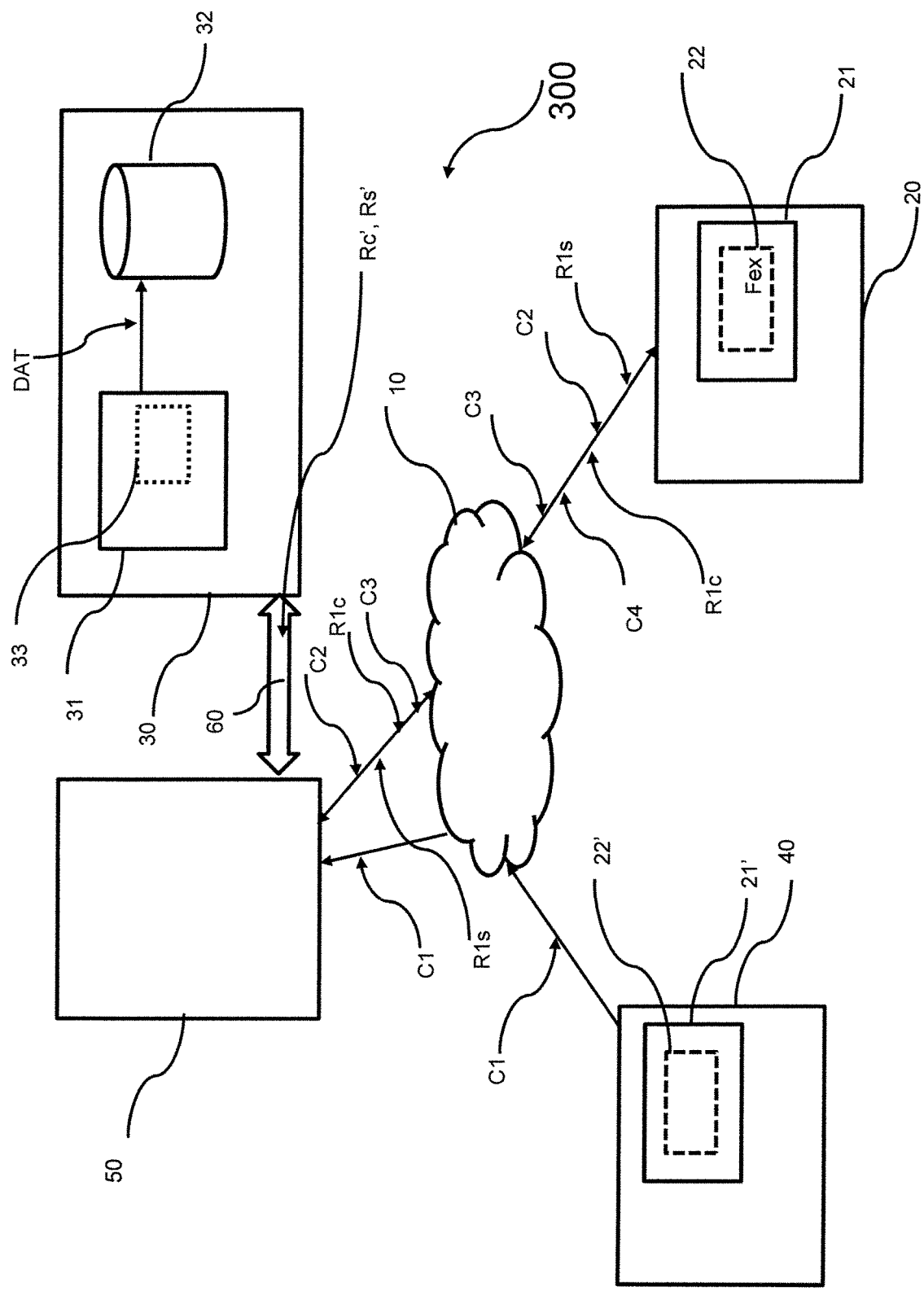
FIG. 3 schematically shows a block diagram of a third embodiment of a computer system adapted to implement the method for displaying confidential information and data employing a virtual desktop of the present description.

With reference to FIG. 3, a block diagram of a third embodiment of a computer system, adapted to implement the method of the present description, is overall indicated with reference numeral 300.

In the embodiment of FIG. 3, the method is preferably implemented by means of a telecommunications network 10, for example, the Internet 10.

In particular, the computer system 300 comprises a first 20 and a second 40 electronic device 20, in particular of the portable type, associated with a first and with a second user, respectively.

Such first 20 and second 40 electronic devices are configured to connect to the Internet 10. For such object, for example, such portable electronic devices 20, 40 are equipped with a module for transferring data to the Internet in wireless mode by means of dedicated access points (in accordance with the Wi-Fi communication standard) and/or a respective module allowing for the transfer of data by means of the radio networks (for example, in accordance with the fourth/fifth generation communication standard-4G/5G).

Such portable electronic devices 20 and 40 comprise a respective graphical user interface (GUI) or display 21, 21' for displaying a standard desktop and one or more virtual desktops 22, 22'.

The computer system 300 further comprises a processing apparatus 30, in particular a server, for managing the access and display service of confidential information and data by a user.

Such processing apparatus 30 is analogous to that described with reference to the computer system 100 of FIG. 1.

In particular, such processing apparatus 30 comprises a processing unit or microprocessor 31 operating on the basis of an operating system, for example Windows O.S., and a memory unit 32 controlled by the aforesaid microprocessor 31 to store such confidential information and data in encrypted form.

The microprocessor 31 is configured to run the application program 33 recalled above, which includes functional blocks configured to implement the method for managing the access and display service of confidential information and data of the invention.

Furthermore, the computer system 300 comprises a further processing apparatus 50 connected to the processing apparatus 30 by means of a digital data transmission means 60.

In a particularly advantageous embodiment, such data transmission means 60 coincides with the Internet 10.

Such further processing apparatus 50 is embodied, for example, by a server for managing video/audio-conferencing services, such as the Cisco WEB-EX service or any analogous video/audio-conferencing service.

Starting from the above mentioned structural features of the computer system 300, a third embodiment is described below of the method for managing the access and display service of confidential information and data by users, which are associated with the first 20 and the second 40 portable electronic devices, respectively.

In the specific case, the method allows the user associated with the second portable electronic device to share, in protected mode, confidential information and data DAT displayed on a virtual desktop 22' of a respective display 21' with the user associated with the first portable electronic device 20.

In particular, the method comprises a step of accessing, by means of the second portable electronic device 40, to the further processing apparatus 50 by means of a browser of the Internet 10.

In particular, such step of accessing comprises a step of sending, by means of the second portable device 40, a respective first message C1 indicative of the confidential information or data DAT which are desired to be shared in protected mode, by means of the virtual desktop, with the first portable electronic device 20.

Furthermore, the method comprises a step of sending to the first portable device 20, by means of the further processing apparatus 50, a respective second message C2 which includes information comprising the date/time of the video/audio-conference, a web link for accessing the video/audio-conference and a code for marking the video/audio-conference as confidential.

In the run-up of the video/audio-conference, the method comprises a step of sending, by means of the first portable device 20, to the further processing apparatus 50 a third message C3 indicative of the confidential information or data DAT which is desired to be displayed.

In greater detail, such third message C3 comprises a request for the protected display of the confidential information or data DAT to be displayed, associated with a specific and unique identifier ID.

Furthermore, the method comprises the step of sending, by means of the further processing apparatus 50, a first request message Rc' to the processing apparatus 30 to obtain an executable file $F_{ex}$ representative of the unique identifier ID of the confidential information or data DAT which is desired to be displayed.

Furthermore, the method comprises the step of receiving, by means of the further processing apparatus 50, such executable file $F_{ex}$ by means of a first response message RS'.

Furthermore, the method comprises the step of sending, by means of the further processing apparatus 50, the executable file $F_{ex}$ to the first portable electronic device 20 by means of a fourth message C4.

Subsequently, the method provides for a step of enabling or launching on the first portable electronic device 20 such executable file $F_{ex}$ to launch the display of or generate a virtual desktop 22 on the display 21 of the first portable device 20 itself.

Such generating step is analogous to that described with reference to the computer systems 100, 200.

Once the virtual desktop 22 environment is launched, the method comprises a step of sending, by means of the first portable electronic device 20, by means of the executable file $F_{ex}$, a second request message R1c to the further processing apparatus 50. Such second request message R1c includes the aforesaid unique identifier ID of the information or data DAT to be displayed.

Such second request message R1c is provided to the server 30 by the further processing apparatus 50.

The method further comprises a step of acquiring, by means of the microprocessor 31 of the server 30, the information or data DAT stored in the memory unit 32 in encrypted form.

The method further comprises a step of decrypting, by means of the microprocessor 31, said information or data DAT to generate a respective plaintext information or data DAT1.

Such plaintext data is provided to the further processing apparatus 50.

Furthermore, the method comprises a step of sending, by means of the aforesaid further processing apparatus 50, a first response message R1s to the first portable device 20 containing the plaintext information or data DAT1 to be displayed in the protected environment of the virtual desktop 22.

It should be noted that, also in this third embodiment, the virtual desktop 22 associated with a unique identifier ID is generated by the respective executable file $F_{ex}$ in a manner analogous to what has been described above with reference to the computer system 100.

It should be noted that such executable file has the same properties and ensures the same advantages as the executable file described with reference to the first embodiment of the method of the invention.

The method of the present invention fully achieves the intended objects.

In fact, advantageously, by means of the employment of the virtual desktop 22, it is possible to provide the portable electronic device 20, for example, the laptop computer or the smartphone of the user, with confidential information and data DAT in protected mode, i.e., so as to prevent the copy or the capture of such information once this is displayed on such device of the user.

Furthermore, the method of the present invention allows, advantageously, also the sharing of confidential information and data in a safe manner between more users provided with respective electronic devices, in particular of the portable type.

Those skilled in the art, in order to satisfy contingent needs, may modify and adapt the embodiments of the method described above, and replace elements with other functionally equivalent, without departing from the scope of the following claims.

Each of the features described as belonging to a possible embodiment may be achieved independently from the other embodiments described.

The invention claimed is:

1. A method for managing an access and display service of confidential information and data by a computer system including at least one electronic device associated with a user, said method comprising the steps of:
   selecting, by a processing unit of the computer system, the confidential information or data to be displayed on a display of the electronic device based on a unique identifier associated with said confidential information or data;
   acquiring said confidential information or data in encrypted form from a memory unit of the computer system associated with said processing unit;
   decrypting, by the processing unit said confidential information or data in encrypted form to generate plaintext information or data;
   generating a virtual desktop associated with said electronic device, comprising the steps of:
   generating the virtual desktop on the display of the electronic device;
   providing the generated virtual desktop only with a process associated with an executable file representative of the unique identifier of the confidential information or data to be displayed;
   providing, by the processing unit of the computer system, a message containing said plaintext information or data to be sent to the virtual desktop for being displayed, wherein said step of providing the generated virtual desktop only with the process associated with the executable file comprises the further steps of:
   providing, at an initial time instant, coinciding with the generation of the virtual desktop, for a list of processes active on the electronic device, associated with said initial time instant and including only the process associated with said executable file;
   periodically accessing said process list to check for presence of new active processes, said step of accessing being performed in time instants following said initial time instant, wherein each of said time instants is separated from a following instant by a predetermined duration time interval;
   comparing content of the process list associated with a first time instant with the process list associated with the initial time instant;
   deleting, from the process list associated with said first time instant, all active processes different from the process associated with the executable file to disable the active processes different from the process associated with the executable file.

2. A method for managing an access and display service of confidential information and data by a computer system according to claim 1, wherein a duration of each time interval separating one of said time instants from the following instant is 250 msec.

3. A method for managing an access and display service of confidential information and data by a computer system according to claim 1, wherein said computer system comprises a processing apparatus, distinct from the at least one electronic device of the user and including said processing unit, and wherein:
   said step of selecting the confidential information or data to be displayed comprises a step of sending, by the electronic device, a request message to the processing apparatus, said request message including the unique identifier of the information or data to be displayed; and
   said step of providing the plaintext information or data comprises a step of sending, by the processing apparatus, a response message (Rs) to the electronic device containing said plaintext information or data to be displayed on the generated virtual desktop.

4. A method for managing an access and display service of confidential information and data by a computer system according to claim 1, wherein said computer system consists of the electronic device associated with the user.

5. A method for managing an access and display service of confidential information and data by a computer system according to claim 1, wherein said computer system comprises:
   a first electronic device and a second electronic device, associated with a first user and a second user, respectively;
   a processing apparatus including said processing unit of the computer system;
   a further processing apparatus connected to the processing apparatus by a digital data transmitter;
   wherein the method further comprises the steps of:
   sending to the further processing apparatus, by the second electronic device, a first message indicative of the confidential information or data the second user wishes to share with the first user by the virtual desktop of the first electronic device;
   sending to the first electronic device, by the further processing apparatus, a second message indicative of the confidential information or data to be shared;
   sending, by the further processing apparatus, a first request message to the processing apparatus to obtain the executable file representative of the unique identifier of the confidential information or data to be shared;
   sending to the further processing apparatus, by the processing apparatus, a first response message including said executable file;
   sending to the first electronic device, by the further processing apparatus, the executable file by a third message;
   following the generation of the virtual desktop on the display of the first electronic device, the method further comprises the steps of:
   sending, by the first electronic device, a second request message to the further processing apparatus, said second request message including the unique identifier of the confidential information or data to be displayed;
   providing, by the further processing apparatus, said second request message to the processing apparatus to run the steps of selecting the confidential information or data to be displayed, acquiring said confidential information or data in encrypted form and decrypting said confidential information or data to generate the plaintext information;
   providing the further processing apparatus with said plaintext confidential information or data to be sent to the first electronic device for displaying on the generated virtual desktop.

6. A method for managing an access and display service of confidential information and data by a computer system according to claim 5, wherein said digital data transmitter connecting the further processing apparatus to the processing apparatus coincides with the Internet.

7. A method for managing an access and display service of confidential information and data by a computer system according to claim 5, wherein said further processing apparatus is a server for managing video/audio-conferencing services.

8. A method for managing an access and display service of confidential information and data by a computer system according to claim 1, wherein said at least one electronic device is a portable device selected from the group consisting of: laptops, smartphones, tablets, smartwatches.

9. A computer system for managing an access and display service of confidential information and data by one or more users, comprising:
- at least one electronic device associated with said user, said electronic device comprising a display for displaying a virtual desktop;
- a processing unit;
- a memory unit associated with said processing unit;
- said computer system being configured to:
- select, by said processing unit of the computer system, the confidential information or data to be displayed on a display of said electronic device based on a unique identifier associated with said confidential information or data;
- acquire said confidential information or data in encrypted form from said memory unit associated with said processing unit;
- decrypt, by said processing unit said confidential information or data in encrypted form to generate plaintext information or data;
- generate the virtual desktop associated with said electronic device, said electronic device being configured to:
- generate the virtual desktop on the display of said electronic device;
- provide the generated virtual desktop only with a process associated with an executable file representative of the unique identifier of the confidential information or data to be displayed;
- said processing unit of the computer system being configured to provide a message containing said plaintext information or data to be sent to the virtual desktop for display;
- wherein to provide the generated virtual desktop only with the process associated with the executable file, the computer system is configured to:
- provide at an initial time instant, coinciding with generation of the virtual desktop, a list of processes active on said electronic device, associated with said initial time instant and including only the process associated with said executable file;
- periodically access said list of processes to check for presence of new active processes, said step of accessing being performed in time instants following said initial time instant, wherein each of said time instants is separated from a following time instant by a predetermined duration time interval;
- compare content of the list of processes associated with a first time instant with the list of processes associated with the initial time instant;
- delete from the list of processes associated with said first time instant, all active processes different from the process associated with the executable file to disable the active processes different from the process associated with the executable file.

* * * * *